June 30, 1959     S. C. HETH     2,892,245
METHOD OF MANUFACTURE OF SLIDE FOR SPREADERS
Filed March 4, 1955     2 Sheets-Sheet 1
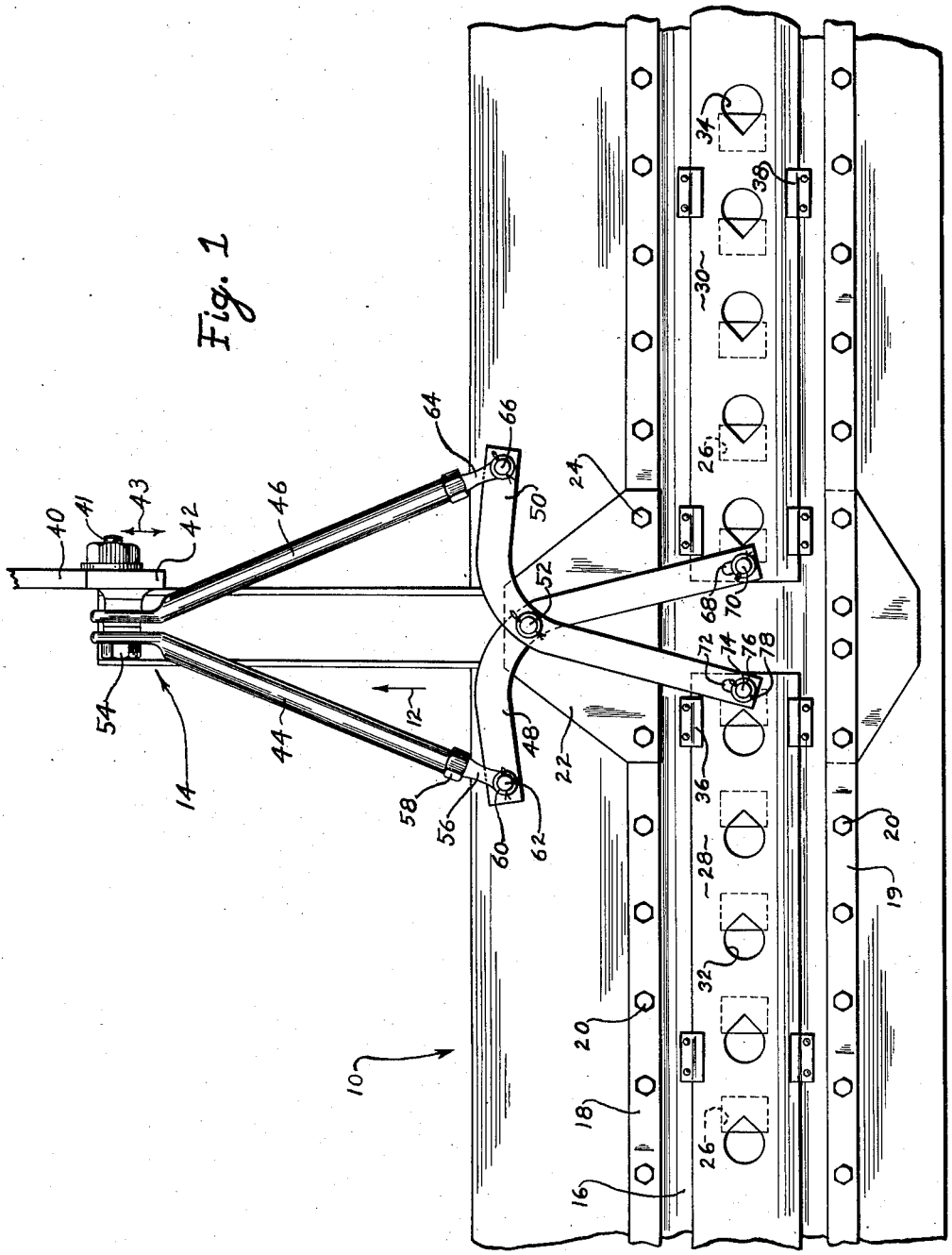
INVENTOR.
SHERMAN C. HETH
BY
Emerson B Donnell
ATTORNEY June 30, 1959 S. C. HETH 2,892,245
METHOD OF MANUFACTURE OF SLIDE FOR SPREADERS
Filed March 4, 1955 2 Sheets-Sheet 2
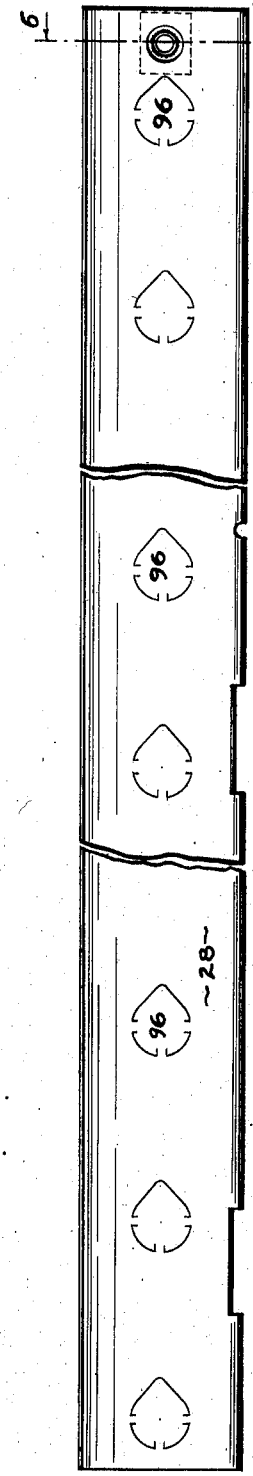
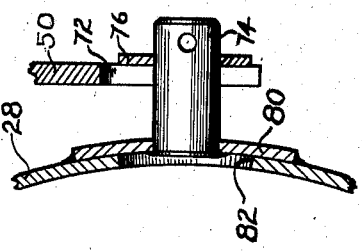
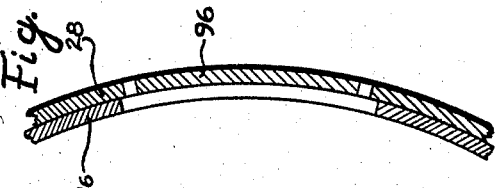
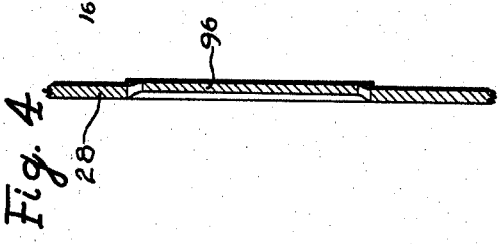
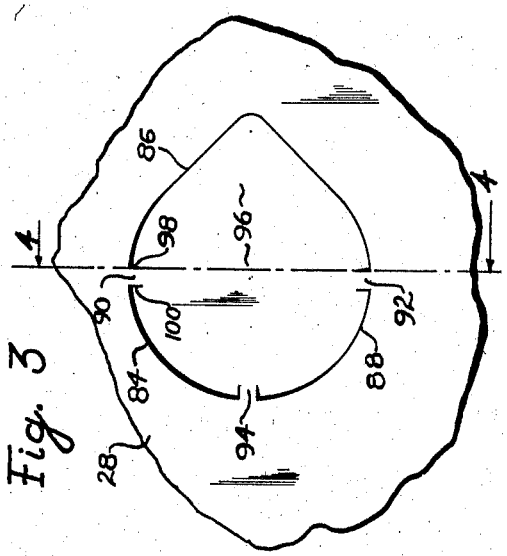
INVENTOR.
SHERMAN C. HETH
BY
Emerson B Donnell
ATTORNEY

United States Patent Office 2,892,245
Patented June 30, 1959

2,892,245

METHOD OF MANUFACTURE OF SLIDE FOR SPREADERS

Sherman C. Heth, Racine, Wis., assignor to J. I. Case Company, Racine, Wis., a corporation of Wisconsin Application March 4, 1955, Serial No. 492,235

3 Claims. (Cl. 29—148.3)

The present invention relates to a method of making spreaders for granular material such as fertilizer, seeds, sand or the like and a general object thereof is to improve the construction and operation of devices of this type.

More particularly an object of the invention is to improve the regulating means for controlling the discharge of material and a further object is to devise a component of such a spreader and a process or method for the manufacture thereof which will make this possible.

Further objects and advantages will appear from the following description and accompanying drawings in which:

Figure 1 is a bottom plan view of so much of a spreader embodying the invention as is necessary to understand the device;

Fig. 2 is a top plan view somewhat enlarged of a component of Fig. 1;

Fig. 3 is an enlarged detail of certain construction indicated in Fig. 2;

Fig. 4 is a sectional view taken on the line 4—4 of Fig. 3;

Fig. 5 is a similar view showing the condition of the part after a subsequent operation; and Fig. 6 is a fragmentary sectional view taken on the line 6—6 of Fig. 2.

Similar reference characters have been applied to the same parts throughout the specification and the various views of the drawings.

As seen in Fig. 1 the machine includes a hopper generally designated as 10 which as above suggested is supported above the ground and propelled in the direction of the arrow 12 as by means of a drawbar 14, the hopper having a bottom portion 16, in the present instance removably fastened to the hopper by means of framing or reinforcing strips 18 and 19 and bolts 20, drawbar 14 being fixed in relation to hopper 10 in any suitable manner as for example by fastening to a plate 22 attached to reinforcing strip 18 by means of bolts 24. Bottom portion 16 is provided with a plurality of openings or discharge holes 26, preferably spaced apart in a series and selectively closed by sheet metal members, strips or slides 28 and 30 which may be selectively provided with openings 32 and 34 respectively registering with above mentioned openings 26 in certain positions of the parts.

Slides 28 and 30 are retained in position against bottom portion 16 so as to be relatively freely slidable in the direction of their lengths preferably by clips 36 and 38 riveted or otherwise suitably fixed in relation to bottom portion 16.

Bottom portion 16 and slides 28 and 30 are preferably (although not necessarily) in the shape of a channel or portion of a surface of revolution as indicated in Fig. 5 and slides 28 and 30 engage bottom portion 16 in substantially complete surface contact.

Slides 28 and 30 are arranged to be readily shifted by the operator of the machine, a suitable adjusting lever 40 fulcrumed on a bolt 41 spaced above drawbar 14 actuating a portion 42 selectively in the directions indicated by arrow 43 and, through links 44 and 46, rocking bell cranks 48 and 50 about a fulcrum 52 fixed in relation to plate 22, link 44 being pivoted on a pin 54 fixed on member 40 and being provided with a shank portion 56 adjustable in relation to the link, the adjustment being maintained by a lock nut 58. Shank 56 includes an eye portion 60 engaging a pivot 62 fixed on bell crank 48, the assemblage assuring rocking of bell crank 48 in response to movement of actuating portion 40. In similar manner link 46 has an adjustable shank portion 64 engaging a pin 66 on bell crank 50. Bell crank 48 is connected with slide 30 while bell crank 50 is connected with slide 28, the adjustment of shanks 56 and 64 providing for coordinating the movement of the slides with that of actuating portion 40 and with each other so that openings 26 controlled by openings 32 in slide 28 will discharge the same amount of material as openings 26 controlled by openings 34 in slide 30.

Bell crank 48 is provided with a slot 68 engaging a pin 70 fixed in relation to slide 30 so that swinging of bell crank 48 will cause lengthwise movement of slide 30. In similar manner bell crank 50 has a slot 72 engaging a pin 74 fixed on slide 28, a washer 76 and cotter key 78 serving to maintain the parts in assembled relation as more particularly seen in Fig. 6. As also seen in Fig. 6, pin 74 is welded or otherwise fixed in a reinforcing plate 80 preferably welded over an opening 82 in above mentioned slide 28. In this way pin 74 is securely attached to slide 28 but without projecting beyond the upper margin thereof which might interfere with easy sliding movement of slide 28 in relation to bottom portion 16.

Openings 26, 32 and 34 may be of various shapes within contemplation of the invention, openings 26 being illustrated as approximately square while openings 32 and 34 are in the form of circles but modified to have a substantially V-shaped portion extending in the direction of movement of slides 28 and 30 when increasing the effective area of openings 26.

Fig. 1 shows the device with all of the openings 32 and 34 in effect. Turning now to Figs. 2 to 5 inclusive it will be apparent that slide 28 (in the condition in which the device is delivered to the user) has no openings but merely areas which may be "punched out" to provide such openings. Fig. 3 shows a section of the sheet metal forming the slide 28 (it being understood of course that all characteristics of slide 28 are preferably duplicated in slide 30) such sheet metal being in the present instance flat and provided with three slits 84, 86 and 88 defining between them a section or slug of the same material which is cut from the main portion except for the small sections between the ends of the slits, this procedure leaving tangs 90, 92 and 94 connecting the slug designated as 96 with slide 28. Slides 84, 86 and 88 are formed by a punching process which, as seen in Fig. 4 offsets slug 96 to a substantial extent, indicated as about one-half of the thickness of the material, thus stretching tangs 90, 92 and 94 a material amount. Furthermore at their ends, slits 84, 86 and 88 are provided with reentrant cuts or continuations designated as 98 and 100. Thus tang 90 is given a definite form and a portion of material taken from slug 96 so that there is sufficient metal to withstand the stretching effect without complete rupture. As will be understood tangs 92 and 94 are similarly treated and all the slugs are substantially alike so that it will not be necessary to describe the others in detail.

In the fabrication of slide 28, after slugs 98 are formed and displaced as just described, and shown in Fig. 4, a further pressing operation is performed in which slide 28 is formed into a curved cross section or segment of a surface of revolution, such pressing operation forcing slug 96 back into its original relation with slide 28 or into a position contiguous with the sheet metal member 28. Such working of tangs 92 and 94 will of course weaken them substantially so that a sharp blow with a hammer or blunt instrument will fracture the tangs and remove slug 96 from sheet metal member 28 thereby providing a port, hole or opening which can register more or less with one of the openings 26 in the hopper bottom, in accordance with the adjusted position of slide 28.

The operation of the device is thought to be clear from the above description, sufficient to say that, when a farmer receives one of these spreaders he decides what sort of a distribution pattern will suit his particular operations. He then knocks out as many slugs 96 as will give him the right number and arrangement of openings to spread material in such pattern and proceeds to operate the device. It will be noted that, with slide 28 moved somewhat further to the right in Fig. 1, openings 32 will register entirely with holes 26 so that slugs 96 may be readily knocked out from above by the use of a drift, or similar long metallic instrument used with a hammer as is common. In view of the contiguous or flush arrangement of slug 96 as seen in Fig. 6, any slugs which are not knocked out will slide smoothly against bottom portion 16 and in effect keep the corresponding opening 36 permanently closed.

It it within the contemplation of the invention to retain the slugs 96 since, if in view of changing conditions it is desired to change the material distribution pattern, it is readily possible to replace the slugs in as many as desired of the openings 32 and secure them in place in any suitable manner as for example with a small amount of welding material.

The above being a complete disclosure of an illustrative embodiment of the invention, what is claimed as new and desired to be secured by Letters Patent of the United States is:

1. The method of forming a slide for a spreader of the type comprising an ambulant hopper having a bottom portion providing a series of discharge holes controlled by said slide; the steps of punching, in a substantially flat sheet metal member, a series of groups of slits, each group defining therebetween a slug of material, and at the same time displacing said slug an amount equivalent to a substantial portion of the thickness of the material, out of the general plane of said sheet metal member, spacing the slits of each group at their ends to leave a plurality of tang portions therebetween connecting said sheet metal member and each slug, stretching said tang portions by said displacing of said slugs, bending said sheet metal member and said slugs into segments of a surface of revolution and pressing said slugs back into a position contiguous with said sheet metal member whereby to weaken said tang portions for easy fracture when it is desired to selectively knock out some of said slugs to form a discharge pattern for said spreader.

2. The method of forming a slide for a spreader of the type comprising an ambulant hopper having a bottom portion providing a series of discharge holes controlled by said slide; the steps of punching, in a substantially flat sheet metal member, a series of groups of slits, each group defining therebetween a slug of material, and at the same time displacing said slug an amount equivalent to a substantial portion of the thickness of the material, out of the general plane of said sheet metal member, spacing the slits of each group at their ends to leave a plurality of tang portions therebetween connecting each slug with said sheet metal member, stretching said tang portions by said displacing of said slugs, and pressing said slugs back into a position contiguous with said sheet metal member whereby to weaken said tang portions for easy fracture when it is desired to selectively knock out some of said slugs to form a discharge pattern for said spreader.

3. The method of forming a slide for a spreader of the type comprising an ambulant hopper having a bottom portion providing a series of discharge holes controlled by said slide; the steps of punching, in a substantially flat sheet metal member, a series of groups of slits, each group defining therebetween a slug of material, and at the same time displacing said slug an amount equivalent to a substantial portion of the thickness of the material, out of the general plane of said sheet metal member, spacing the slits of each group at their ends to leave tang portions therebetween connecting said sheet metal member and said slug, stretching said tang portions by said displacing of said slugs, bending said sheet metal member and said slugs into segments of a surface of revolution and at the same time pressing said slugs back into a position contiguous with said sheet metal member whereby to weaken said tang portions for easy fracture when it is desired to selectively knock out some of said slugs to form a discharge pattern for said spreader.

References Cited in the file of this patent

UNITED STATES PATENTS

| | | |
|---|---|---|
| 853,547 | Harbeck | May 14, 1907 |
| 953,300 | Schulz | Mar. 29, 1910 |
| 985,634 | Rodgers | Feb. 28, 1911 |
| 2,113,675 | Brown | Apr. 12, 1938 |
| 2,278,393 | Vutz | Mar. 31, 1942 |
| 2,286,285 | Kriegbaum | June 16, 1942 |
| 2,290,222 | Barbknecht | July 21, 1942 |
| 2,541,008 | Stahmer et al. | Feb. 6, 1951 |
| 2,624,492 | Seltzer | Jan. 6, 1953 |
| 2,661,124 | Ajero | Dec. 1, 1953 |